Figure 1:
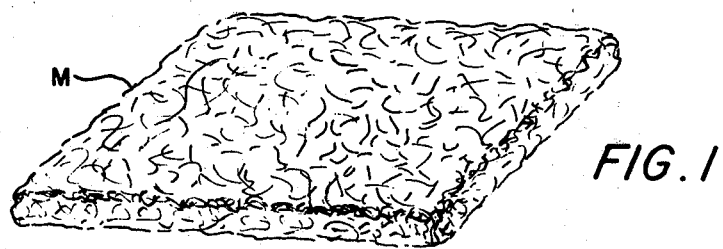
Figure 2:
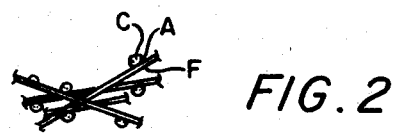

United States Patent [19]

Petrow

[11] 4,399,185
[45] Aug. 16, 1983

[54] LOW PRESSURE-DROP CATALYTIC MAT AND METHOD OF PREPARING THE SAME

[75] Inventor: Henry G. Petrow, Watertown, Mass.

[73] Assignee: Prototech Company, Newton Highlands, Mass.

[21] Appl. No.: 303,583

[22] Filed: Sep. 18, 1981

[51] Int. Cl.³ .............................................. B32B 5/16
[52] U.S. Cl. .................................. 428/253; 428/288; 428/329; 428/285; 252/477 R; 210/500.1; 427/126.4; 427/376.2
[58] Field of Search .............. 428/283, 285, 288, 328, 428/329; 252/477 R; 427/126.4, 376.2, 203, 125; 210/500.1

[56] References Cited

U.S. PATENT DOCUMENTS

| | | | |
|---|---|---|---|
| 3,331,787 | 7/1967 | Keith et al. | 252/477 R |
| 3,861,853 | 1/1975 | Petrow | 431/7 |
| 4,082,699 | 4/1978 | Petrow et al. | 252/472 |
| 4,083,905 | 4/1978 | Insley et al. | 252/477 R |
| 4,102,819 | 7/1978 | Petrow et al. | 252/460 |
| 4,248,682 | 2/1981 | Lindstrom et al. | 204/114 |

Primary Examiner—George F. Lesmes
Assistant Examiner—Beverly K. Johnson
Attorney, Agent, or Firm—Rines and Rines, Shapiro and Shapiro

[57] ABSTRACT

This disclosure is concerned with a novel limp, low-pressure-drop catalytic mat, particularly adapted for use in ignitible gas-flow systems, such as heated hair curlers and the like, comprising in preferred form a loosely packed quartz fiber mat to the fibers of which have been adhered oxide particles as of alumina and the like, coated with platinum catalytic particles, without, however, impairing the limpness, looseness and flexibility of the mat.

21 Claims, 1 Drawing Figure

LOW PRESSURE-DROP CATALYTIC MAT AND METHOD OF PREPARING THE SAME

The present invention relates to low pressure-drop catalytic structures and a method of preparation of the same, being more particularly concerned with novel limp, loosely packed fibrous catalytic mats for use in ignitible gas-flow systems, such as heated hair curlers and the like, as well as in a myriad of other systems requiring similar properties in a catalytic structure.

The art is replete with all kinds of catalytic structures for systems in which air or other gases or fluids are to be passed and subjected to catalytic action in passing through such structures. Illustrative of such are, for example, my earlier U.S. Pat. Nos. 3,861,853; 4,082,699 and 4,102,819; and also, U.S. Pat. No. 4,248,682.

There are, however, certain applications where the catalytic structures cannot be rigid or semi-rigid, but are required to be very flexible, limp and readily deformable or shapable as for wrapping about geometrical structures (as in the exemplary hair curler application above referred to and in which the very stringent low pressure-drop requirements are also imposed). In such applications, moreover, it is desired to have as thin a structure as possible while yet providing efficacious catalytic activity that normally would require considerable catalytic platinum or other similar materials. The problem of maintaining such substrates limp and flexible despite the application of sufficient catalyst throughout the same is also intimately involved in such applications.

It is to the solution of such and related problems that the present invention is accordingly primarily directed, it being an object of the invention to provide a new and improved catalytic structure particularly, though not exclusively, adapted for overcoming such and other difficulties, and providing an effective limp, loosely packed, low pressure-drop catalytic mat employing minimum quantities of catalyst.

A further object is to provide an improved catalytic mat and method of preparing the same of more general utility as well.

Other and further objects will be explained hereinafter and are more particularly delineated in the appended claims.

The invention will be described with reference to the single FIGURE of the accompanying drawing showing a magnified portion of a catalytic mat constructed in accordance with a preferred embodiment.

In summary, however, from one of its viewpoints, the invention embraces a low pressure-drop catalytic structure comprising a limp, loosely packed, fibrous, relatively low surface area porous mat to the fibers of which, throughout the mat, non-volatile relatively high surface area oxide particles have been adhered and upon which catalytic material has been coated.

A suitable limp, loosely packed, flexible or shapable, light-weight, low pressure-drop mat material for use in applications of the type described is of so-called quartz "wool"; loosely matted quartz fibers or the like, as shown at M in the drawing. Mats of such nature, in thin layers of, say, 0.7 to 1.5 centimeters in uncompressed, loose form have very low pressure-drop characteristics of the order of about an inch of water.

The problem involved in attempting to catalyze such a mat resides in the necessity to keep substantially the original looseness or openness of structure, to maintain the same mat limpness, flexibility and shapeability without stiffening the structure despite catalyzing, and to provide a permanently adhered high surface area catalytic coating or attachment to the otherwise relatively low surface area quartz fibers of the mat, and throughout the thickness of the mat. In accordance with the invention, this is accomplished by applying preferably colloidal alumina or the like to the fibers, ensuring the adhering of the alumina particles to the fibers throughout the mat, and coating the alumina particles with smaller platinum or similar catalytic particles.

At first it appeared that such a technique would not serve the purposes of the invention since, in a mixture of colloidal alumina and aqueous platinum solutions, there exists the tendency of the electrolyte of the platinum compounds, such as chloroplatinic acid (CPA), to cause gelling of the colloid that can form a continuous structure and greatly increase stiffness and pressure drop. Furthermore, after colloidal alumina is applied to quartz fibers, it dries with a measure of adherence to the fibers; but when the dried out particles are covered with an aqueous platinum-containing solution, they have a tendency to redisburse through the mat fibers, again affecting the openness, flexibility and pressure drop characteristics of the same.

In accordance with the invention, however, it has been discovered that, by a special technique, these problems can be completely eliminated. Specifically, it has been discovered that if the alumina colloid, after application to the quartz fiber mat, is heat-dried, preferably at a temperature of the order of about 340° C., the alumina particles (of $\alpha Al_2O_3 \cdot H_2O$) adhere strongly to the fibers F as shown at A, and continue so to adhere even after long hours of high-temperature exposure, as later explained in connection with use of the catalyzed mat. More than this, it was discovered that with such adhesion, subsequent catalyzing by subjecting to the before-mentioned platinum solutions, does not dislodge or disburse the same; and the alumina particles C are then permanently adsorbed thereupon—with the final product almost indistinguishable from the original loose, limp, flexible, low pressure-drop mat. In preferred form, the alumina colloidal particles are of the order of 100 Angstroms or greater in size and present a high surface area of the order of 200 $m^2$/gm., and the platinum particles are preferably also colloidal and of the order of 20 Angstroms, as described in said U.S. Pat. No. 4,102,819.

In addition to substantially no change in low-pressure drop, limpness, porosity or openness and flexibility and shapability of the catalyzed mat from the original mat, the spectacular technical performance has been achieved that, with only as little as 0.5% platinum, the mat performs in high-temperature catalytic use (as at 850°–900° C. for over eight hours—equivalent to the commercial 600 hours of life of a hair curling-cartridge ignitible gas system). By other prior techniques, in excess of 10% platinum has been required to produce similar results.

While it is preferred to use colloidal platinum as before mentioned, non-colloidal CPA may also be directly applied to the alumina particles adhered to the mat fibers, though the colloidal platinum is more strongly adsorbed by the alumina.

In all cases, with the alumina pre-coat, the amount of platinum required (usually of the order of 750–950 mg. per 30.5×45 cm. mat) is only a fraction of what other techniques require. This has provided a highly effective and economical incombustible structure particularly adapted for catalytic oxidation of a gaseous fuel in air, as in the hair curling applications before mentioned, wherein heating is to be produced by releasing pressured isobutane, for example, into the air to flow through the mat.

A comparison of the light-off temperature ($LOT_1$) of the catalyzed quartz mats of the invention (10 mm thickness) before exposure to catalytic combustion, measured by flowing 6.7% isobutane mixed air at a space velocity of 7944 hours$^{-1}$ with and without the alumina pre-coat, is presented in the following TABLE 1, showing the vastly improved results with the invention:

TABLE 1

| | $LOT_1$, (°C.) | |
|---|---|---|
| Pt coated (CPA) on plain quartz mats Average | Pt coated (CPA) on quartz mats precoated with 4.5–5% (w/w) of $\alpha Al_2O_3 \cdot H_2O$ (180m$^2$/gr) Average | % Pt (w/w) of quartz mat (%) |
| 176 | 162.5 | 1.0 |
| 172.5 | 151.5 | 3.0 |
| 171.5 | 140.5 | 7.0 |

The 1% platinum represents about 20% of the weight of the absorbed alumina on the mat, and 7% example, over 200%. When less platinum is used (i.e., less than about 20% of the weight of the alumina) unsatisfactory results for the purposes of this invention have been observed; for example, $LOT_1$ of 232.5° C. for platinum on the plain quartz mat, and 199.5° C. on the alumina-precoated mat for 0.1% platinum (w/w).

With the platinum colloid of U.S. Pat. No. 4,102,819 coated on the alumina, somewhat lower $LOT_1$ temperatures were obtained than with CPA. In the case of the 1.0% platinum, the average $LOT_1$ was found to be 161° C.

After exposure to 8 hours of isobutane catalytic combustion at a high space velocity of 29400 hour$^{-1}$, the light-off temperature $LOT_2$ was found to be 234° C. (average) for 1.0% platinum (CPA) on the plain quartz mat and 186° C. (average) on the alumina-coated mat (4.5–5%). For the said platinum colloid on the alumina, $LOT_2$ was, on average, 185.5° C. for 1.0% platinum of the mat as compared with 210.5° C. for the platinum coated on the plain quartz mats.

The improvement of the invention was also demonstrated after 8 hours of catalytic combustion at high space velocity (3.22% isobutane mixed with air at space velocity of 29400 hours$^{-1}$). With 1.0% platinum (CPA) on the alumina (20% of the weight of the alumina on the mat) 77% isobutane conversion was obtained; 3.0% platinum, 86.5%; and at 7% platinum, 94% (with a maximum theoretical stoichiometric reaction conversion of 96.9%). For the said platinum colloid, 1.0% platinum enabled 90% isobutane conversion; 3.0% platinum, 92% conversion; and 7.0% platinum, 93%.

Apart from physical characteristics, the remarkably low quantities of platinum or other noble metal or related catalyst required with the construction of the invention can also be seen by comparing a performance, stochastic, statistical parameter P, defined as $$P = \frac{(C)^4}{(LOT_2 - LOT_1)^{\frac{1}{2}}(LOT_2)^2} \times 10^8$$

where C is the fraction of isobutane converted (say, 0.85) for a given acceptable performance P (say 239), in the cases of (1) the fiber mat coated with CPA; (2) the mat coated with alumina and then CPA; (3) the mat coated with said colloidal platinum; and (4) the mat coated with alumina and said colloidal platinum:

| Catalyst | % Pt Required |
|---|---|
| 1 | 5 |
| 2 | 1.2 |
| 3 | 1.2 |
| 4 | 0.6 |

The alumina is of considerable assistance in performance of the platinum irrespective of the form of the same. As before indicated, moreover, the alumina coating has materially cut the required platinum amount while actually providing better catalyst performance and endurance than the $Al_2O_3$-free catalyst performance and endurance. Illustratively, when platinum is applied to a typical quartz mat in amount of 7% by weight of the catalyzed mat, the second light off temperature ($LOT_2$) is of the order of 198° C. In contrast, when, typically 4.5% by weight of $Al_2O_3$ is first applied, and 3% Pt by weight is then applied to the quartz mat, the second light off temperature is 170° C. The required platinum in this case has been reduced to less than half by the $Al_2O_3$ coating.

The acceptance level of a catalytic mat in terms of $LOT_2$ (always obviously requiring substantially complete combustion of the fuel—say greater than about 90%), is determined by the use of a catalyst. In general, however, it has been found that the composition of the combined $Al_2O_3$-Pt coating which spectacularly reduces the Pt requirement for typical performance standards, is, as before intimated, in the range of between 20% and 200% by weight of Pt of the weight of the $Al_2O_3$ present. In a preferred mat for the before-mentioned gas-ignitible hair curler uses and the like, about equal percentages of alumina and platinum of the order of 5% have been found most satisfactory.

Moreover, to retain the limp character of the catalyzed mat and its porosity (permitting the desired low pressure drop) it has been found that the $Al_2O_3$ content should not exceed about 12% by weight of the uncatalyzed mat. The lower limits of these contents depends upon the use to which the mat is to be put; but, in general, it has been found that a combined $Al_2O_3$-Pt content should exceed about 5% by weight of uncatalyzed mat, and the platinum content in any event should not, for the principal applications of the invention, be less than about 1% by weight of the uncatalyzed mat.

While reference has above been made to preferred colloidal alumina, which seems particularly effective in apparently also preventing the platinum particles from coalescing under high heat, in certain applications, other similar high surface area oxides, non-volatile and non-reactive in a deleterious manner with the platinum or other catalyst at any temperature, may be employed-again, depending upon the degree of limpness, flexibility and low pressure drop that is desired. Similarly, other fibers as of ceramic and in some instances stainless steel may be matted and used as the mat structure.

In terms of average isobutane conversion, as before discussed, at the end of 8 hours of catalytic combustion at high space velocity (29400 hour$^{-1}$) the following results were obtained for a group of pre-coated oxides with CPA and colloidal Pt catalyzing:

| Precoated oxide (5% w/w) on quartz mat | 3% CPA (w/w) Isobutane Conversion (%) | 3% Pt colloid (w/w) Isobutane Conversion (%) |
|---|---|---|
| None | 81 | 90.5 |
| $\alpha Al_2O_3.H_2O$ | 86.5 | 91.0 |
| $ZrO_2$ | 88.1 | 89.4 |
| $SiO_2$ | 83.7 | 88.2 |
| $TiO_2$ | 84.7 | 92.2 |

Tests with other precoated high surface area oxides, including $ZrO_2$, $SiO_2$ and $TiO_2$, of such properties, on the 10 mm quartz mats, in turn provided with both CPA and said colloidal platinum catalyzing (3% w/w), have shown the following useful $LOT_1$ and $LOT_2$ results with 6.7% isobutane flow mixed in air and at a space velocity of 7499 hour$^{-1}$:

| Precoated oxide (6% w/w) on quartz mat | 3% CPA (w/w) | | 3% Pt. colloid (w/w) | |
|---|---|---|---|---|
| | $LOT_1$ (°C.) | $LOT_2$ (°C.) | $LOT_1$ (°C.) | $LOT_2$ (°C.) |
| None | 172.5 | 207.5 | 178.5 | 192.5 |
| $\alpha Al_2O_3.H_2O$ (180m$^2$/gm) av. – 35 m$\mu$ | 151.5 | 170 | 145.5 | 175.5 |
| $ZrO_2$ (7.7 m$\mu$) | 162 | 193.5 | 162.5 | 199.5 |
| $SiO_2$ (de-ionized) (30m$\mu$) | 162 | 212 | 156 | 200.5 |
| $TiO_2$ (25 m$\mu$) | 160 | 182 | 149.5 | 181 |

With regard to maintaining substantially the same loose, low-pressure porous flexible characteristics as in the original mat, about 4.5–5% colloidal alumina has been found admirably well-suited to achieve this result. In tests with isobutane/air mixture flows of the order of 3.22% and a space velocity of about 47200 hour$^{-1}$, while free-flowing characteristics could be maintained up to about 12% alumina (w/w), the mat became somewhat stiff though it was usable in the region of 10%, more or less. Back-pressure problems have been found to develop with 13.5% alumina and above. At 18% alumina, borderline acceptability of flow for some uses with considerable stiffening of the mat was found; and at greater percentages, poor flow and stiffness even to the extent of cracking or bending were encountered.

In preferred form, the centrifugal spinning of the coated platinum colloid was found effective in excluding Pt impregnation on the quartz mat while leaving selectively adsorbed platinum on the alumina. Clearly further modifications will occur to those skilled in this art, including substituting other well-known noble metal catalysts such as palladium, where desired; and such are considered to fall within the spirit and scope of the invention as defined in the appended claims.

What is claimed is:

1. A low pressure-drop catalytic structure comprising a limp, loosely packed, inorganic fibrous, relatively low surface area porous mat to the fibers of which, throughout the mat, non-volatile relatively high surface area metal oxide particles have been adhered and upon which noble metal catalytic material has been coated.

2. A low pressure-drop catalytic structure as claimed in claim 1 and in which said structure is adapted for catalytic oxidation of a gaseous fuel in air and wherein said mat is a thin gas-permeable incombustible structure.

3. A low pressure-drop catalytic structure as claimed in claim 2 and in which said mat is selected from the group consisting of quartz, ceramic and stainless steel fibers.

4. A low pressure-drop catalytic structure as claimed in claim 2 and in which said oxide particles are selected from the group consisting of $Al_2O_3$, $SiO_2$, $ZrO_2$, and $TiO_2$.

5. A low pressure-drop catalytic structure as claimed in claim 4 and in which the oxide particles are in amount up to about 12% by weight of said mat.

6. A low pressure-drop catalytic structure as claimed in claim 2 and in which said mat is of quartz fibers and said catalytic coating is of platinum material.

7. A low pressure-drop catalytic structure as claimed in claim 6 and in which said oxide particles are of alumina.

8. A low pressure-drop catalytic structure as claimed in claim 7 and in which the alumina particles comprise colloidal alumina particles heat-bonded to the quartz fibers.

9. A low pressure-drop catalytic structure as claimed in claim 8 and in which the platinum material is in the form of colloidal platinum particles.

10. A low pressure-drop catalytic structure as claimed in claim 9 and in which the platinum particles are of the order of about 20 Angstroms, and the adhered colloidal alumina particles are of surface area the order of about 100 Angstroms or greater.

11. A low pressure-drop catalytic structure as claimed in claim 8 and in which the platinum material is a platinum-containing deposit from an aqueous solution of a platinum compound.

12. A low pressure-drop catalytic structure as claimed in claim 8 and in which the percentage of alumina is up to about 12% by weight of said mat.

13. A low pressure-drop catalytic structure as claimed in claim 6 and in which the percentage of platinum is greater than about one percent by weight of said mat.

14. A low pressure-drop catalytic structure as claimed in claim 2 and in which the catalytic material is from about 20% to about 200% of the weight of the adhered oxide particles upon which said catalytic material is adhered.

15. A low pressure-drop catalytic structure as claimed in claim 14 and in which the adhered oxide material is of the order of a few percent of the weight of the said mat and not greater than about twelve percent.

16. A low pressure-drop catalytic structure as claimed in claim 15 and in which said oxide material is alumina and said catalytic material is platinum and the percentage of each is about equal.

17. A low pressure-drop catalytic structure as claimed in claim 16 and in which said equal percentage is of the order of about 5%.

18. A low pressure-drop catalytic structure as claimed in claim 1 in which the mat comprises fibers selected from a group comprising quartz and quartz-like fibers, ceramic fibers and stainless steel fibers.

19. A method of preparing a low pressure-drop incombustible catalytic structure adapted for catalytic oxidation of a gaseous fuel in air, that comprises, applying metal oxide particles particles to and throughout a limp, loosely packed relatively low surface area porous mat of inorganic fibers; heat-drying the metal oxide particles to bond the same to the fibers as a relatively high surface area coating throughout the mat; and applying platinum material to coat the metal oxide particles and catalyze the same throughout the mat.

20. A method as claimed in claim 19 and in which the amount of metal oxide is controlled to under about 12 percent of the weight of the mat, and the amount of platinum is limited to from about 20 percent to about 200 percent of the weight of the applied metal oxide particles, and in which the metal oxide particles are colloidal alumina and the inorganic fibers are quartz.

21. A method as claimed in claim 20 and on which the platinum material is colloidal platinum and the same is centrifuge-spun to exclude platinum impregnation on the mat with selective adsorption on the metal oxide particles.

* * * * *